United States Patent
Self (10) Patent No.: US 9,094,277 B2
(45) Date of Patent: Jul. 28, 2015

(54) DIGITAL COMPENSATION TECHNIQUE USING AREA EFFICIENT TRI-STATE ARCHITECTURE

(75) Inventor: David Self, Tempe, AZ (US)

(73) Assignee: ViaSat, Inc., Carlsbad, CA (US)

( * ) Notice: Subject to any disclaimer, the term of this patent is extended or adjusted under 35 U.S.C. 154(b) by 515 days.

(21) Appl. No.: 13/607,077

(22) Filed: Sep. 7, 2012

(65) Prior Publication Data

US 2013/0058438 A1 Mar. 7, 2013

Related U.S. Application Data

(60) Provisional application No. 61/531,939, filed on Sep. 7, 2011.

(51) Int. Cl.
 *H04L 27/36* (2006.01)
(52) U.S. Cl.
 CPC .................................. *H04L 27/364* (2013.01)
(58) Field of Classification Search
 CPC ... G11C 11/4097; G11C 11/412; H01L 27/11
 See application file for complete search history.

(56) References Cited

U.S. PATENT DOCUMENTS

| | | | | |
|---|---|---|---|---|
| 5,075,891 | A * | 12/1991 | Yano et al. | 365/190 |
| 2012/0063241 | A1* | 3/2012 | Kajigaya | 365/189.04 |
| 2012/0275207 | A1* | 11/2012 | Houston et al. | 365/72 |
| 2014/0126278 | A1* | 5/2014 | Nii et al. | 365/154 |

OTHER PUBLICATIONS

Schilcher, T., "Digital Signal Processing in RF Applications," Part I, Paul Scherrer Institut, Jun. 6, 2007, pp. 1-44, CAS, Sigtuna, Sweden, DSP—Digital Signal Processing.

* cited by examiner

*Primary Examiner* — Dac Ha
(74) *Attorney, Agent, or Firm* — Snell & Wilmer L.L.P.

(57) ABSTRACT

An integrated circuit device can include a radio-frequency device and a hard-wired lookup table. The radio-frequency device can have an analog input, a digital control input, and an analog output. An unadjusted transfer response of the analog output relative to the analog input and the digital control input can differ from an ideal transfer response. The hard-wired lookup table can be connected to the digital control input of the radio-frequency device to generate a modified digital control input based on a predetermined function. This can have the effect that the adjusted transfer response of the analog output relative to the analog input and the modified digital control input is closer to the ideal transfer response than the unadjusted transfer response of the analog output relative to the analog input and the digital control input. The predetermined function can be defined by metallization connections within the integrated circuit device.

20 Claims, 11 Drawing Sheets

DIGITAL COMPENSATION TECHNIQUE USING AREA EFFICIENT TRI-STATE ARCHITECTURE

CROSS REFERENCE TO RELATED APPLICATIONS

This application is a non-provisional of U.S. Provisional Application No. 61/531,939, entitled "DIGITAL COMPENSATION TECHNIQUE USING AREA EFFICIENT TRI-STATE ARCHITECTURE," which was filed on Sep. 7, 2011, and is hereby incorporated by reference for any purpose in its entirety.

BACKGROUND

Certain types of circuits exhibit less than ideal responses. For example, a phase modulator can accept a digital phase and/or amplitude input to control the phase/amplitude of a radio frequency signal. Non-linearity in the phase modulator can result in the output being different than intended. While some techniques for compensating for such non-idealities are known, challenges are presented when systems are to be integrated onto a chip. Challenges can include: substrate area limitations, radiation hardening requirements, inaccessibility of components for adjustment/tuning, etc.

Substrate area limitations become an issue when attempting to implement a prior art lookup table on an integrated circuit. Often the lookup table includes several logic gates, each of which consumes space on the chip. Often a chip designer has to balance area limitations with less than desired bit resolution of various compensation techniques.

SUMMARY

In some embodiments an integrated circuit device can include a radio-frequency device and a hard-wired lookup table. The radio-frequency device can have an analog input, a digital control input, and an analog output. An unadjusted transfer response of the analog output relative to the analog input and the digital control input can differ from an ideal transfer response. The hard-wired lookup table can have a lookup table digital control input and a modified control function. The modified control function of the hard-wired lookup table can be added to the digital control input of the radio-frequency device to generate a modified digital control input. The hard-wired lookup table can produce the modified control output as a predetermined function of the lookup table digital control input. This can have the effect that the adjusted transfer response of the analog output of the radio-frequency device relative to the analog input and the modified digital control input is closer to the ideal transfer response than the unadjusted transfer response of the analog output relative to the analog input and the digital control input. The predetermined function can be defined by metallization connections within the integrated circuit device.

In various embodiments, the hard-wired lookup table can be implemented in a bus structure using a plurality of value cells. The plurality of value cells can comprise a plurality of open drain transistor cells. In various embodiments, the plurality of value cells can include a value cell, with the value cell comprising a pair of bit-control transistors in communication with an enable signal, a bit bus, and a cross-member. The cross-member can be configured to connect the bit bus to only one of the pair of bit-control transistors. The cross-member can be connected during manufacture in order to set a bit value of the pair of bit-control transistors to form a metallization connection.

DESCRIPTION OF DRAWINGS

A more complete understanding of the present disclosure may be derived by referring to the detailed description and claims when considered in connection with the drawing figures, and:

DETAILED DESCRIPTION

Reference will now be made to the exemplary embodiments illustrated in the drawings, and specific language will be used herein to describe the same. It will nevertheless be understood that no limitation of the scope of the disclosure is thereby intended. Alterations and further modifications of the inventive features illustrated herein, and additional applications of the principles of the inventions as illustrated herein, which would occur to one skilled in the relevant art and having possession of this disclosure, are to be considered within the scope of the disclosure.

As mentioned above, compensation for non-ideality of a device can be provided in various ways. For example, digital control inputs can be transformed using a functional relationship that reduces non-linearity as the output of the device.

Figure 1A:
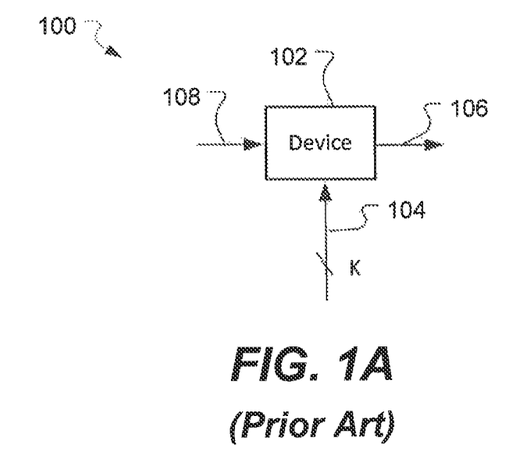
FIG. 1A is an example of a prior art device with analog inputs and outputs and a digital control.

As illustrated in FIG. 1A, a prior art system 100 can include a non-ideal radio-frequency (RF) device 102 which can have a control input 104, an output 106, and an input 108. The output 106 can be an analog output and input 108 can be an analog input. Moreover, control input 104 can be an analog control input or a digital control input. As shown, control input 104 can be a digital control input of K-bits. In various embodiments, an unadjusted transfer response of the analog output 106 relative to the digital control input 104 and the analog input 108 differs from an ideal transfer response. The non-ideal nature of the non-ideal device 102 can be described in terms of a transfer function response between the characteristic of the analog output 106 as a function of the digital control input 104 and the analog input 108. Alternatively, the non ideal nature of the device 102 can be described in terms of a series of transfer functions between the output 106 and the input 108 as a function of the digital control input 104.

Figure 1B:
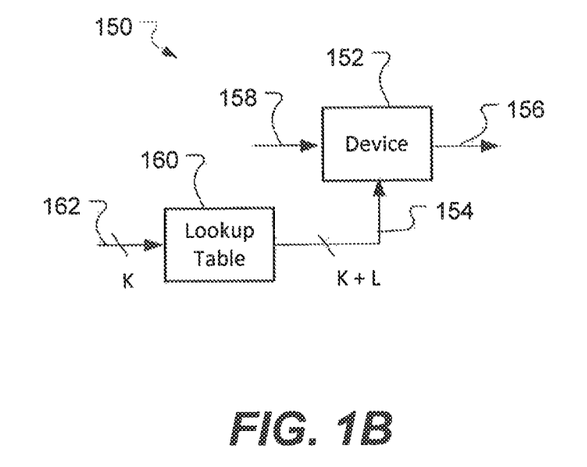
FIG. 1B is an example of an integrated circuit in accordance with various embodiments.

In accordance with various embodiments and with reference to FIG. 1B, a system 150 configured to compensate for non-ideal transfer responses can be implemented in an integrated circuit (e.g. on a single semiconductor substrate). The system 150 can comprise a non-ideal RF device 152 which can have a digital control input 154, an output 156, and an input 158. The output 156 can be an analog output and input 158 can be an analog input. The system can further comprises a lookup table 160, which is coupled to the RF device 152. In some embodiments, the non-ideal device 152 can be a variable gain amplifier (VGA), an attenuator, a phase modulator, a vector modulator, an active vector generator, or the like. Moreover, the semiconductor substrate can comprise silicon, silicon-germanium, or gallium arsenide.

In various embodiments, a transfer response of the analog output 156 relative to the digital control input 154 and the analog input 158 differs from an ideal transfer response. However, in comparison to the unadjusted transfer response of system 100, an adjusted transfer response of system 150 is closer to the ideal transfer response. The lookup table 160 can have a lookup table digital control input 162 and generate a modified control function, where the modified control function is provided to non-ideal RF device 152 as digital control input 154. The modified control function can facilitate generation of the adjusted transfer response of analog output 156 that is closer to the ideal transfer response than the unadjusted transfer response relative to the analog input 158 and an unadjusted digital control input. In various embodiments, digital control input 154 can be a modified control input with a K+L bit resolution. The modified control input with bit resolution results in better resolution of digital control input 154, and is increased by L bits relative the digital control input 104 of FIG. 1A. K can be any suitable integer value greater than 0, although typically K will be greater than 2 (e.g., 4, 5, 6, etc.). Similarly, L can be any suitable integer value greater than 0 (e.g., 1, 2, etc.).

Figure 2:
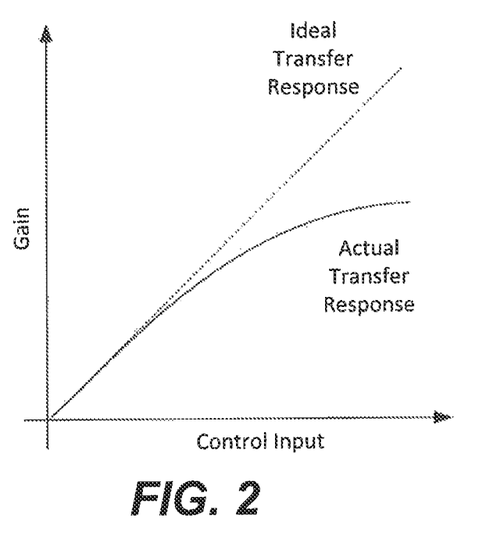
FIG. 2 is an example of a transfer function of an non-ideal device compared to an ideal transfer function.
Figure 3:
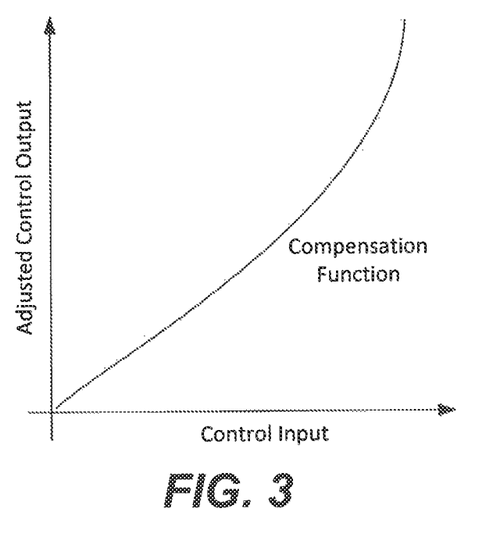
FIG. 3 is an example of a compensation function in accordance with various embodiments.

The lookup table 160 can map the lookup table digital control input 162 into an adjusted control function that reduces the non-idealities of the device 152. More particularly, the lookup table 160 can implement a non-linear compensation function that compensates for the non-linearity of the RF device 152. The non-linear compensation function can be a predetermined function of the lookup table digital control input 162 such that an adjusted transfer response of the analog output 156 relative to the analog input 158 is closer to the ideal transfer response than the unadjusted transfer response of the analog output 156 relative to the analog input 158. For example, in some embodiments, the device can be a variable gain amplifier that exhibits compression at the upper end of its range as shown in FIG. 2. FIG. 3 shows a compensation function that can be implemented in the lookup table to compensate for the non-linearity. In particular, for this example, the effect of the compensation function can be to provide an even larger adjusted output as the control input increases to compensate for the reduced gain at large control input values of the variable gain amplifier. The net effect can be to improve the linearity of the response of the gain of the variable gain amplifier in response to the digital control input.

In accordance with various embodiments, a method of compensating an analog output of a radio-frequency device can include receiving an analog input and a digital control input at the radio-frequency device. Further, the method can include generating, by the radio-frequency device, an analog output based on the analog input and the digital control input. The method can further include producing, by a hard-wired lookup table, a modified control function as a predetermined function of a lookup table digital control input of the hard-wired lookup table. The method can include combining the modified control function with the digital control input to generate a modified digital control input such that an adjusted transfer response of the analog output of the radio-frequency device relative to the analog input and the modified digital control input is closer to the ideal transfer response than the unadjusted transfer response of the analog output relative to the analog input and the digital control input. Moreover, the predetermined function can be defined by metallization connections within the integrated circuit device.

Various ways of implementing the lookup table 160 can be used. For example, the lookup table can be implemented using a programmable memory. Such an approach can, however, consume a large amount of substrate area. For example, typical memory cells use several transistors (e.g., 6 or more), plus additional circuitry associated with the read and write functions for the memory cells. Moreover, programming the memory can require additional circuitry and operational capabilities.

In accordance with various embodiments, a lookup table providing reduced substrate area can be implemented in a bus structure using a plurality of value cells. The plurality of value cells can comprise a number of addressable tri-stateable pullup/pulldown cells. The data contents of the cells can be programmed by metallization connections which control or enable a pull-up or pull-down transistor connected to a memory output bus. The plurality of values cells can comprise a plurality of open drain transistor cells in the resulting pullup/pulldown cells.

The metallization connections can be defined by a mask layer that allows the cell contents to be defined substantially independently of the rest of the layout of the integrated circuit. In particular, to change the contents within the lookup table, metallization connections between one or more transistors within the cells and the output bus can be defined, and layout of all other aspects of the integrated circuit can remain fixed. The cells can be substantially identical, differing only in vias that interconnect metal layers. This can allow for changes in the compensation function at late design stages or redesign stages. Accordingly, in some embodiments, table contents can be defined (or changed) after tape-out of the integrated circuit with back-end fabrication line changes in a single mask layer. This can help to minimize cost and schedule impacts.

By using a simple lookup table using metallization connections to define the memory contents, radiation tolerance of the device can be enhanced. This can be beneficial for devices which must operate in a high radiation environment (e.g., space).

Figure 4:
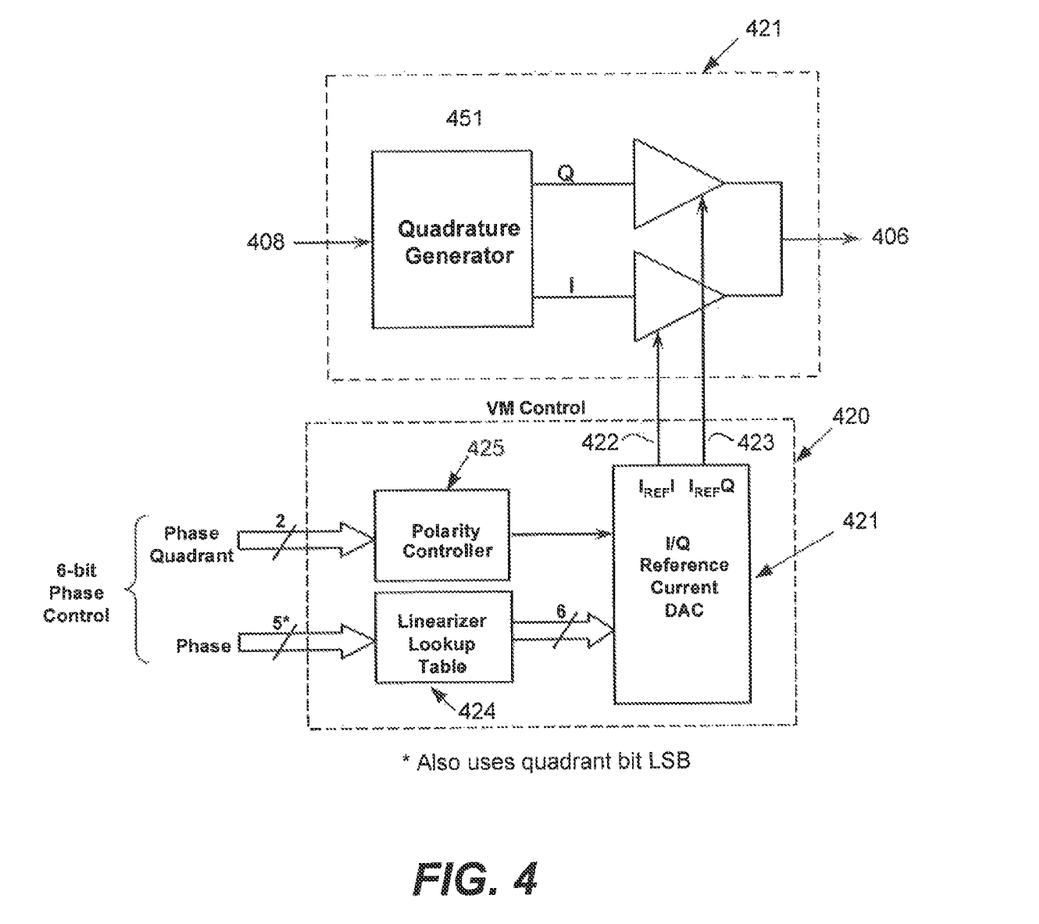
FIG. 4 is an example of a quadrature modulator device with digital compensation in accordance with various embodiments.

For example, FIG. 4 illustrates an embodiment using a vector modulator device 450. An RF input 408 is split into in-phase and quadrature components using a quadrature generator 451, and then (vector) modulated using outputs from vector modulator control 420 to generate a vector modulated output 406. In various embodiments, vector modulator control 420 comprises an I/Q digital to analog converter (DAC) 421 that generates an in-phase reference signal 422 and a quadrature reference signal 423. Nonlinearities in the vector modulator device 450 can be compensated using a linearizer lookup table 424. In various embodiments, linearizer lookup table 424 can include an address decoder (not shown). Furthermore, a polarity controller 425 can control the quadrant of output 406 and thereby control the polarity of output 406. For example, a 6-bit phase control can use 2-bits of the phase control to set the phase quadrant (0,0; 0,1; 1,0; 1,1).

The example system shown in FIG. 4 also takes advantage of symmetries in the transfer function of the vector modulator 450 to reduce the size of the lookup table 424, in particular, a 6-bit phase control can cover 0-360 degrees, and thus specify any of 4 quadrants (polarity of the I/Q components). For a device which has at least some quadrant symmetry (or approximate quadrant symmetry), the same compensation that is used in one quadrant can be used in another quadrant. For example, for a device having bi-fold symmetry, the same compensation that is used in quadrants 1 and 2 can be used in quadrant 4 and 3, respectively. This can allow the linearizer lookup table to use half as many entries. In other examples, a device may have four-fold symmetry (in which case the same compensation can be used in all four quadrants, providing another factor of two reduction). In other examples, the device may have no symmetry, in which case the full phase control can be used for the lookup table.

Figure 5:
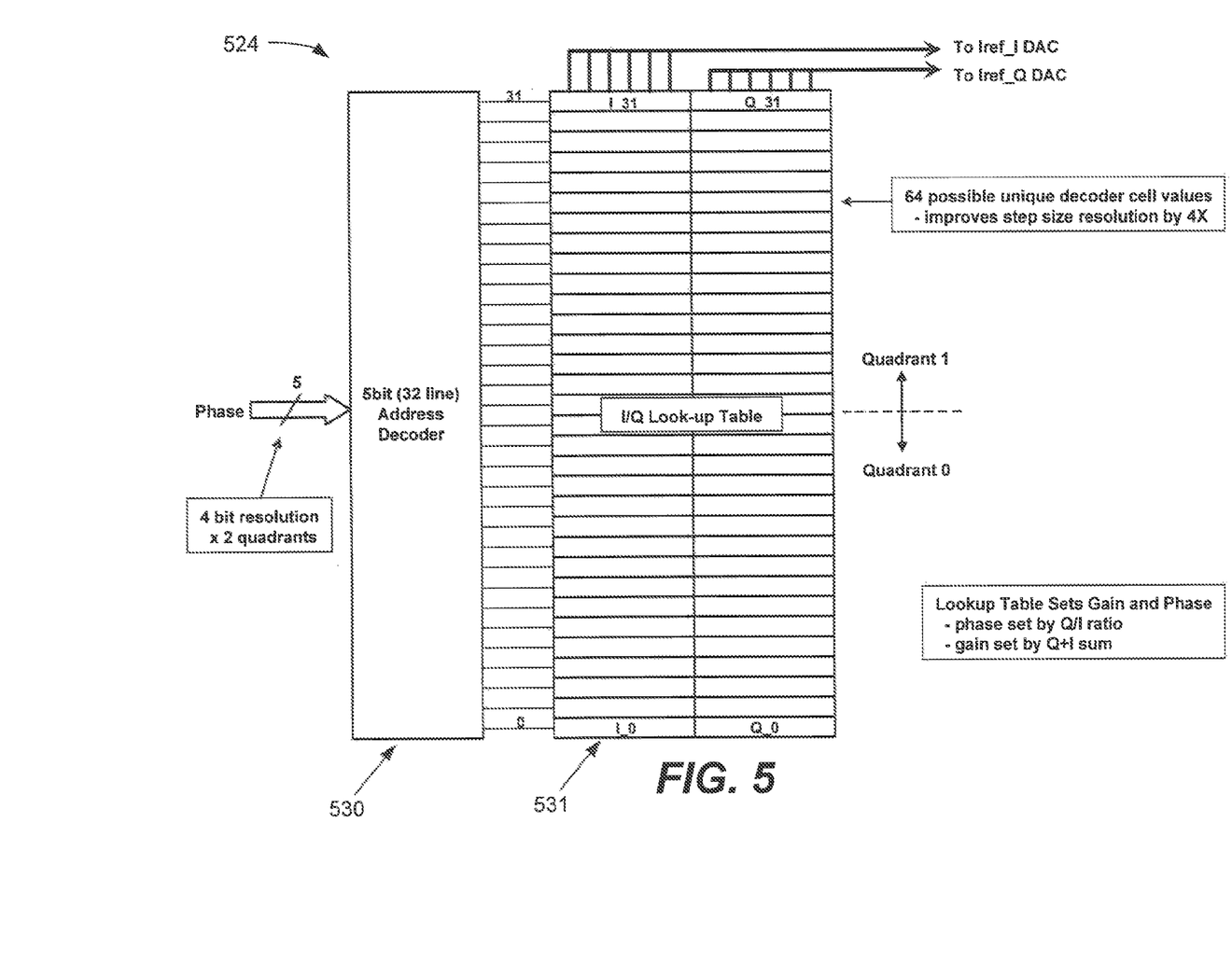
FIG. 5 is an example of a phase lookup table with compensation for the system of FIG. 4 in accordance with various embodiments.

FIG. 5 provides further detail of a phase lookup table for the device described with reference to FIG. 4. In accordance with various embodiments and with reference to FIG. 5, a phase lookup table 524 can comprise an address decoder 530 and a lookup table 531. Address decoder 530 can receive a 5-bit phase value to select a particular row of the lookup table 531. A 5-bit phase value can be used to select up to 32 rows in the lookup table 531. Each row of the lookup table 531 contains specific compensating values for the I and Q values to be applied to the phase modulator. In the example illustrated in FIG. 5, the individual I and Q values are each 6 bits wide. However, the bit size of the lookup table values can be any desired value.

In accordance with various embodiments, phase state symmetry of a device can be used to reduce the number of values in a lookup table, and can also be applied to fully access a lookup table using a common phase control bit size. For example, in various embodiments of a bi-fold symmetry device, a 6-bit phase control can provide 2-bits of quadrant control and 5-bits of phase value to access a 32-bit lookup table. The "additional" bit of control is due to using one of the two quadrant control bits in the phase value bits. Since the same compensation functions can be used for two quadrants in a bi-fold symmetry device, the quadrant control bit that determines which half of the phase circle the device is operating in can also be used as an additional bit to determine which half of the lookup table from which to select the appropriate row. As another example, in various embodiments of a device with four-fold symmetry, an appropriate row in the lookup table can be accessed without use of either quadrant control bit in the phase value bits, resulting in a 6-bit phase control providing 2-bits of quadrant control and 4-bits of phase value to access a 16-bit lookup table. In yet another example, in various embodiments of a device with no symmetry, both quadrant control bits can be used in the phase value bits, resulting in a 6-bit phase control providing 2-bits of quadrant control and 6-bits of phase value to access a 64-bit lookup table.

Figure 6:
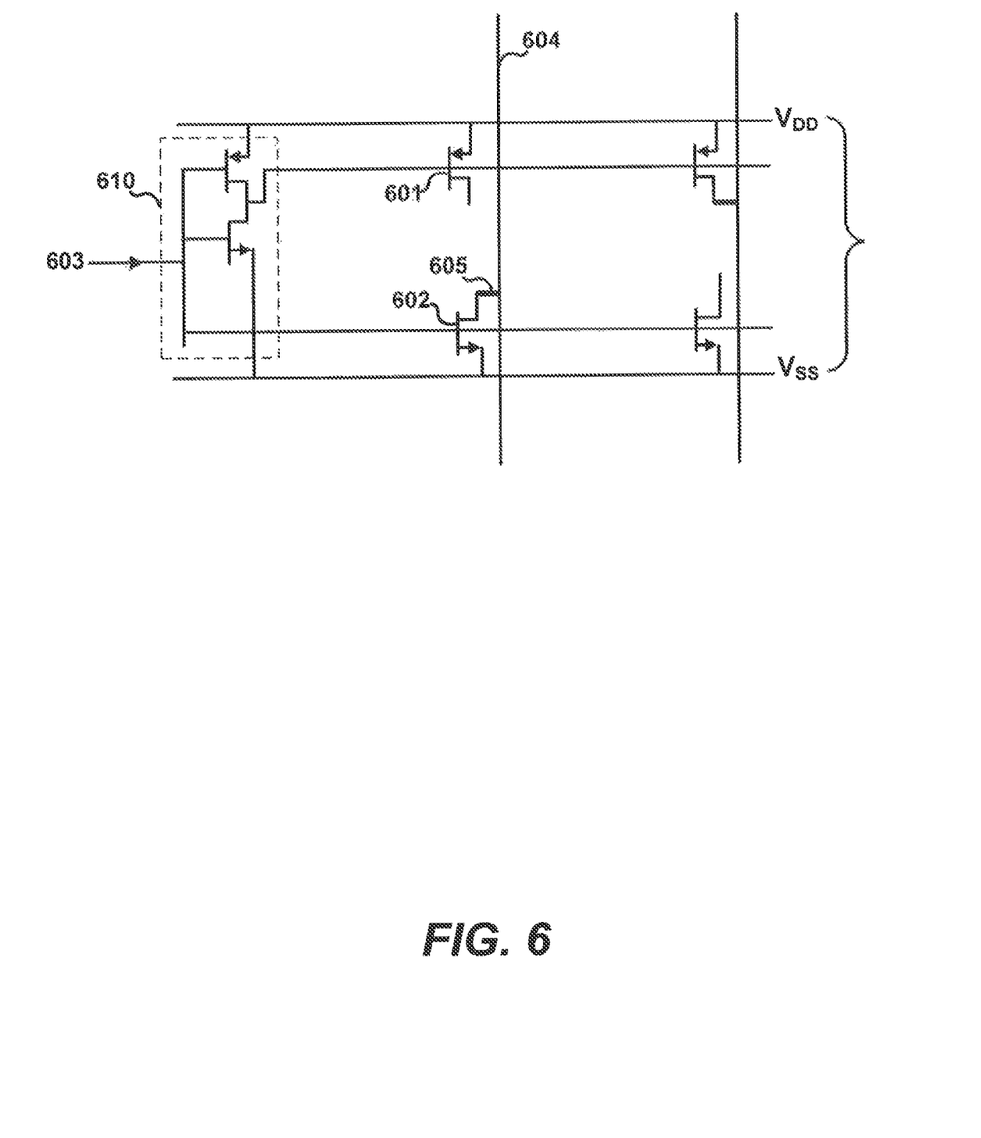
FIG. 6 is an example of a value cell within a lookup table in accordance with various embodiments.

In the lookup table, each row provides an individual compensation function that is generated as an in-phase reference signal and a quadrature reference signal. The rows of the lookup table comprise a value cell that is wired for binary output. In various embodiments and with reference to FIG. 6, a value cell 600 comprises a pair of bit-control transistors 601, 602 in communication with an enable signal 603, a bit bus 604, and a cross-member 605 connecting the bit bus 604 to only one of the pair of bit-control transistors 601, 602. The cross-member 605 can be connected during manufacture in order to set a bit value of the pair of bit-control transistors 601, 602 to form a metallization connection. In operation, an enable signal received at the value cell 600 is provided to each bit-control transistor in the pair of bit-control transistors 601, 602. If the bit-control transistor 601 or 602 is connected to bit bus 604 via cross-member 605, then the enabled bit-control transistor is turned on and bit bus 604 reads a value. For example, as shown in FIG. 6, bit-control transistor 602 is connected to bit bus 604 via cross-member 605. In response to bit-control transistor 602 receiving an enable signal, bit-control transistor 602 can be active and providing a pull-down signal to bit bus 604. In another example, bit-control transistor 601 can be connected to bit bus 604 via cross-member 605 (not shown). In response to bit control transistor 601 receiving an enable signal, bit-control transistor 601 can be active and providing a pull-up signal to bit bus 604.

In various embodiments, value cell 600 can further comprise an enable module 610, which receives an enable signal and provides two transistor enable signals to at least one pair of bit-control transistors. The two transistor enable signals provided are dependent upon the type of transistors in the pair of bit-control transistors. For example, an n-channel FET may receive the enable signal and a p-channel FET may receive an inverted enable signal. In one example and with reference to FIG. 6, enable module 610 can comprise an inverter comprising a p-channel FET in series with an n-channel FET. The source of the n-channel FET can be connected to a source supply voltage (Vss). Similarly, the source of the p-channel FET can be connected to a drain supply voltage (Vdd). The enable signal can be provided to the gate of both the p-channel and n-channel FETs. Further, the drain of the p-channel FET can be connected to the drain of the n-channel FET, where an inverted enable signal is connected to the node of the p-channel and n-channel FET drains.

In various embodiments, the pair of bit-control transistors 601, 602 can include a p-channel FET and an n-channel FET, respectively. The enable signal can be provided to the gate of the n-channel FET. Further, the source of the n-channel FET can be connected to a source supply voltage (Vss), and, via cross-member 605, the drain of the n-channel FET can be connected to the bit bus 604. Similarly, an inverted enable signal can be provided to the gate of the p-channel FET. Further, the source of the p-channel FET can be connected to a drain supply voltage (Vdd), and, via cross-member 605, the drain of the p-channel FET can be connected to the bit bus 604.

In addition to the pair of bit-control transistors 601, 602 being a p-channel FET and an n-channel FET, respectively, in various embodiments the pair of bit-control transistors 601, 602 can be other types of complementary transistor pairs. For example, the complementary transistor pairs can be pnp and npn bi-polar junction transistors. Furthermore, as would be known to one skilled in the art, enable module 610 and the corresponding enabling signals are dependent upon the transistor type of the pair of bit-control transistors 601, 602.

Figure 7:
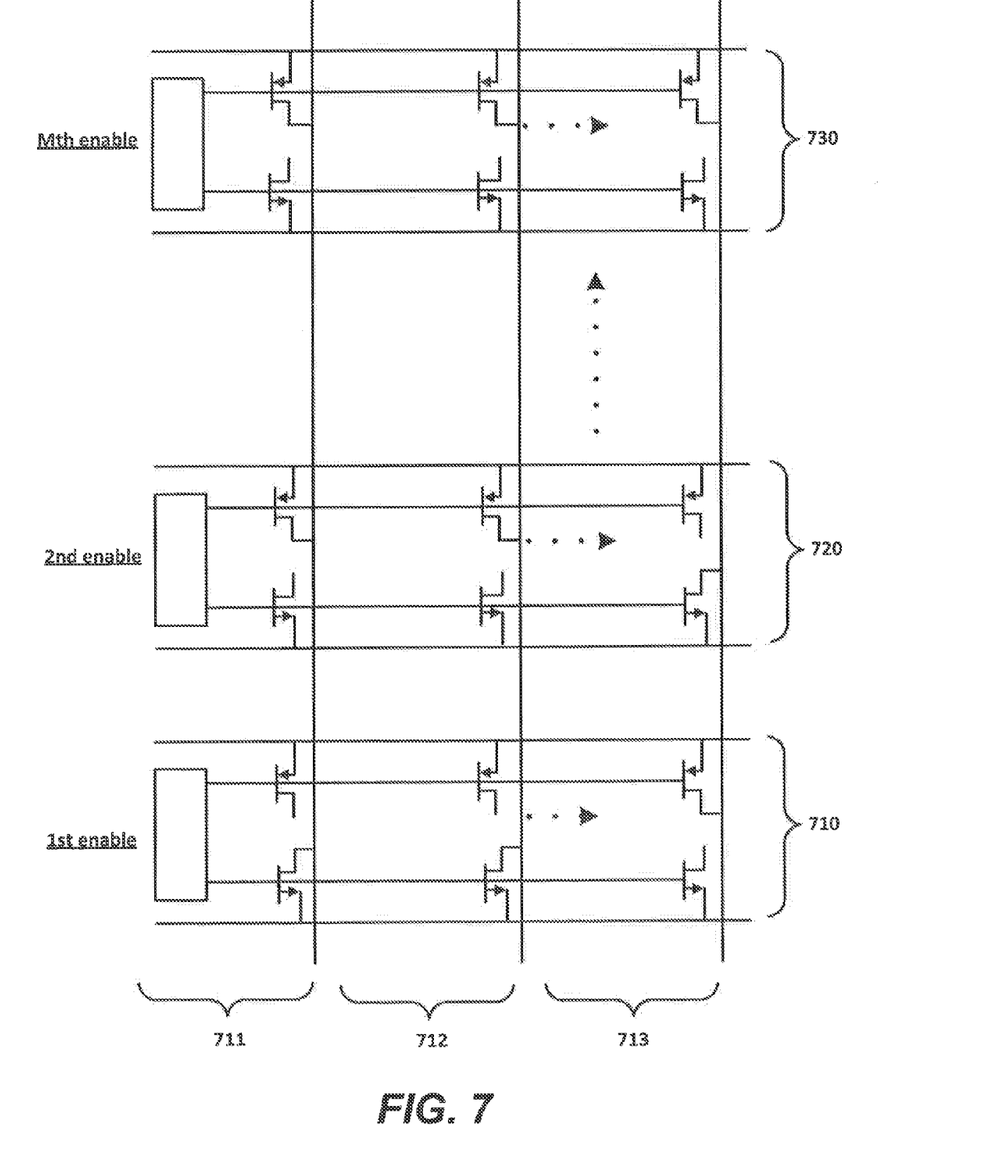
FIG. 7 is an example of a lookup table with a scalable number of value cells and a scalable number of bits provided by the value cells.

A value cell can comprise several pairs of bit-control transistors and corresponding bit buses. Each pair of bit-control transistors are configured to provide a value to a respective bit bus. For example and as illustrated in FIG. 7, a first value cell 710 can comprise a first pair of bit-control transistors 711, a second pair of bit-control transistors 712, up to an $N^{th}$ pair of bit control transistors. Along with N pairs of bit-control transistors, first value cell 710 can also comprise N bit buses, and N cross-members connecting the bit bus to one transistor of the pairs of bit-control transistors. All of the N pairs of bit-control transistors can be enabled by the same enable signal. Moreover, a lookup table can further comprise several value cells, such as a second value cell 720 up to an $M^{th}$ value cell 730. The number of value cells is merely limited by the number of unique addresses in an address decoder, though physical design limitations may also be a factor.

Accordingly, a lookup table can comprise 2*M*N number of bit-control transistors in an M×N lookup table, where M and N can be can be any suitable integer value greater than 0, although typically M and N will each be greater than 3 (e.g., 4, 5, 6, etc.). In various embodiments, a lookup table has no more than 2*M*N number of bit-control transistors in an M×N lookup table. Further, in one embodiment, a lookup table can be limited to 2*M*N number of bit-control transistors in an M×N lookup table. In contrast to the various embodiments of lookup tables comprising only 2*M*N bit-control transistors as described with reference to FIG. 7, prior art lookup tables typically may have numerous logic gates, each logic gate having multiple transistors. The difference in the number of transistors increases as the dimensions of the lookup increase, which can result in a vast size difference in an integrated circuit layout for a lookup table with the same dimensions. Further, in the various embodiments, only half of the 2*M*N bit-control transistors are physically connected to a bit bus and capable of providing a bit value. However, as previously discussed, the additional unconnected transistors provide flexibility at the design (or redesign) stage by simplifying changing the binary values of each value cell in a lookup table.

In various embodiments, an integrated circuit device includes a hard-wired lookup table having a predetermined function. A method of setting the predetermined function can include determining a size of the hard-wired lookup table, where the size is based on a number of value cells in the hard-wired lookup table and a number of output bits from the hard-wired lookup table. Further, the method can include determining an output value of the output bits for each value cell of the number of value cells in the hard-wired lookup table, and determining the binary values of each value cell in the hard-wired lookup table based on the output value of the value cell. The number of value cells can individually comprise at least one bit bus and at least one pair of bit-control transistors in communication with an enable signal. Moreover, the method can include selecting a transistor connection for each of the at least one pair of bit-control transistors in each of the number of value cells. A cross-member can connect the at least one bit bus to only one of a corresponding pair of bit-control transistors of the at least one pair of bit-control transistors to form a metallization connection. The cross-member can be connected during manufacture in order to set the binary value of the corresponding pair of bit-control transistors.

Figure 8:
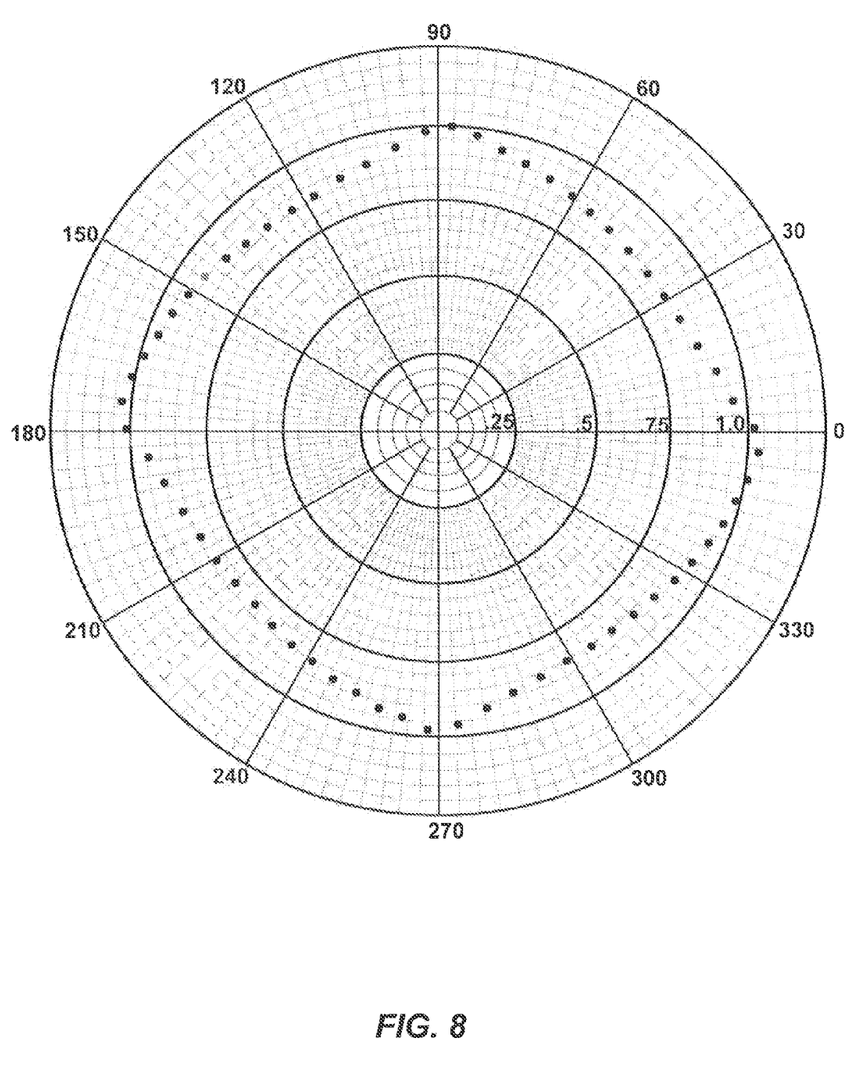
FIG. 8 shows an example phase constellation of a vector modulator without the linearization correction.
Figure 9:
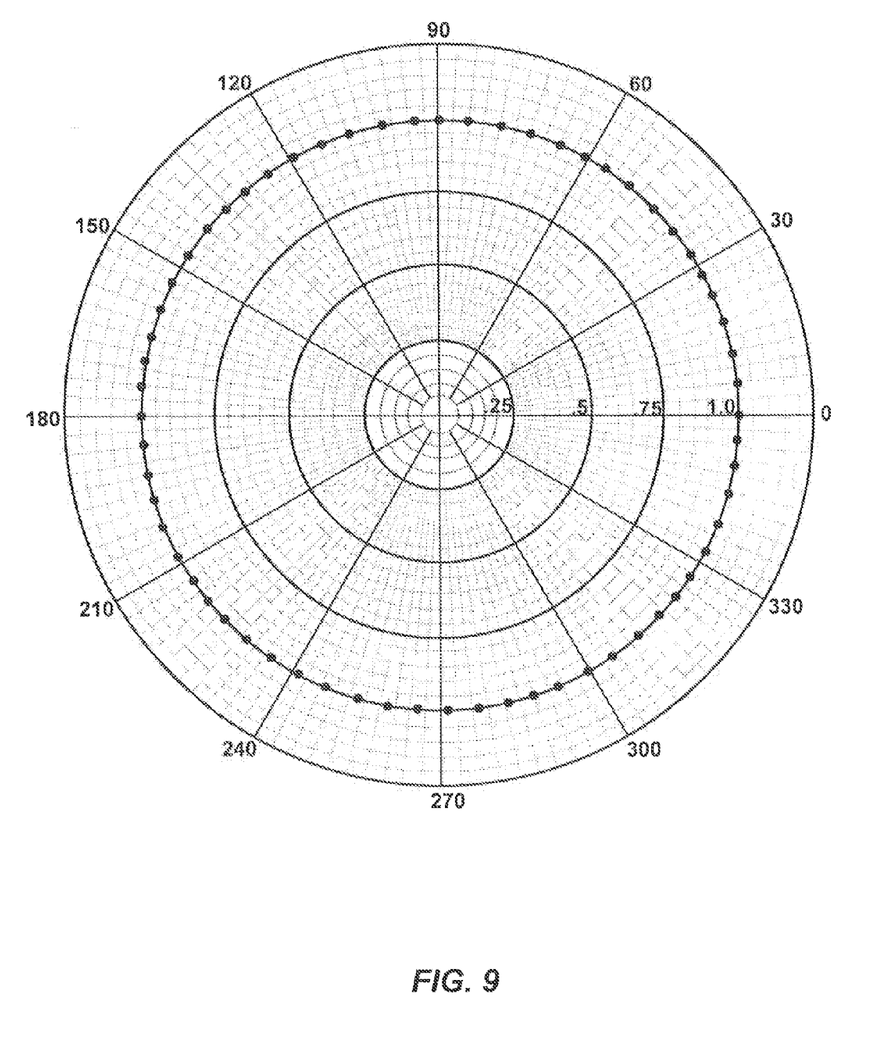
FIG. 9 shows an example phase constellation of a vector modulator with the linearization correction.
Figure 10:
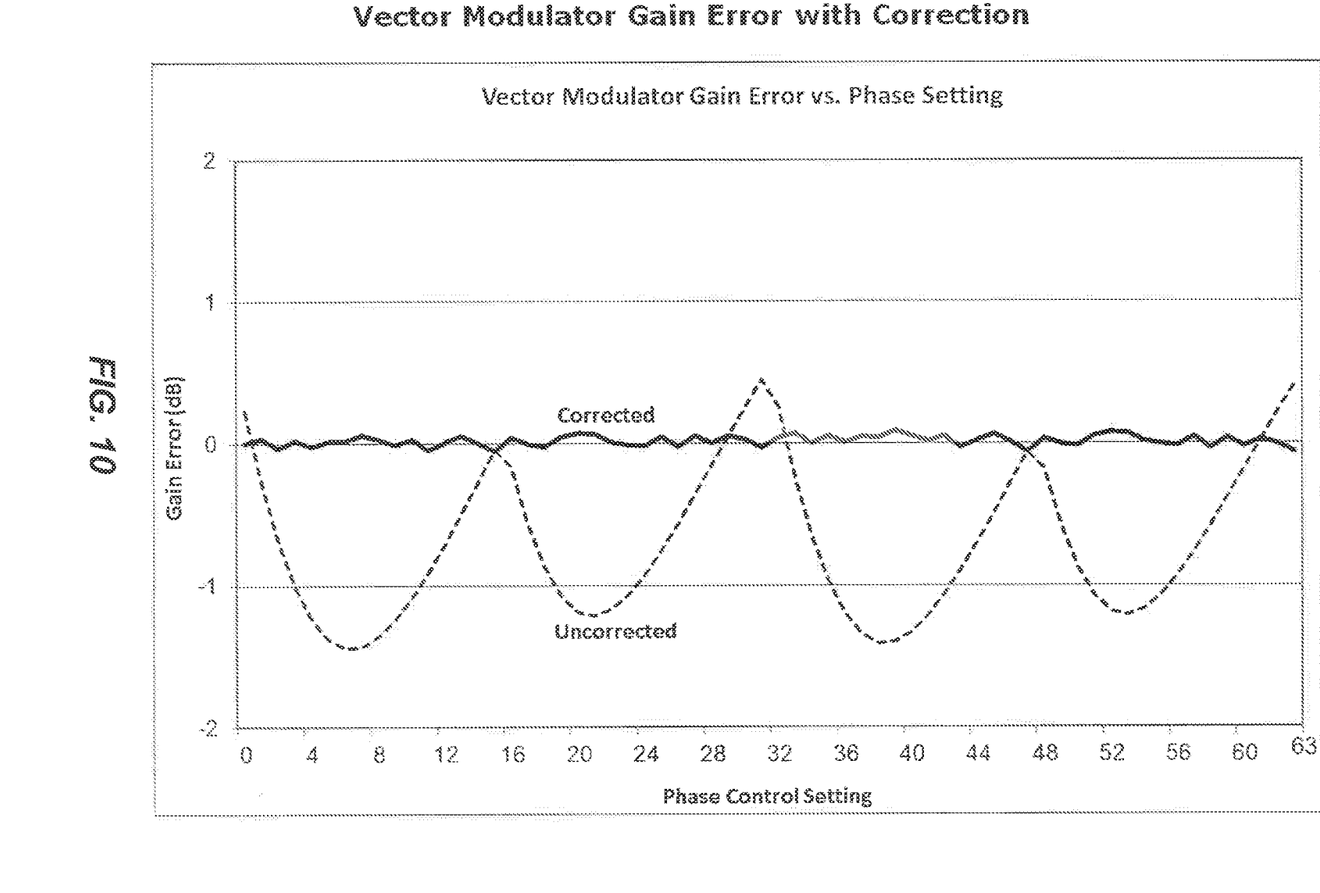
FIG. 10 shows an example gain error of a vector modulator both without and with the linearization correction.
Figure 11:
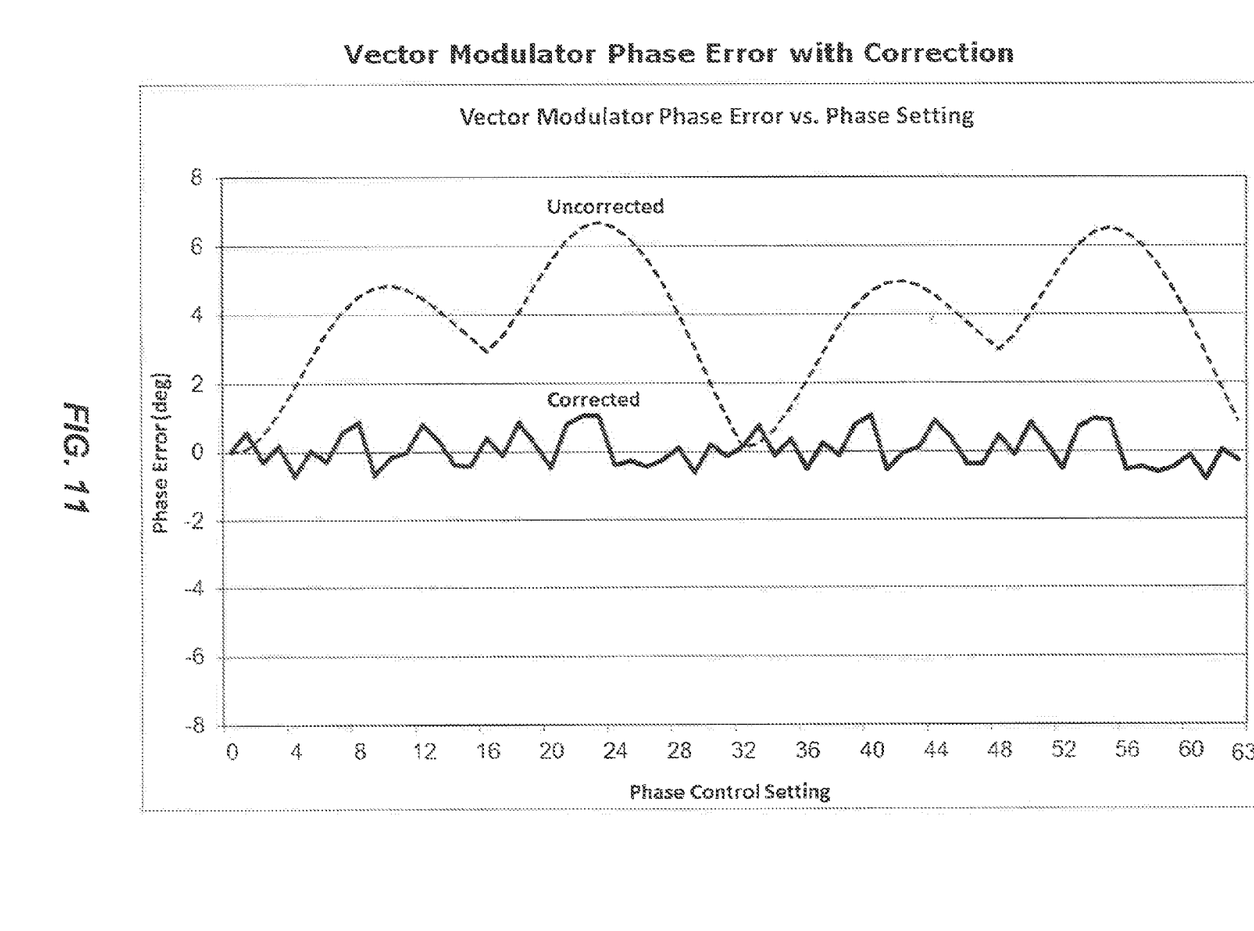
FIG. 11 shows an example phase error of a vector modulator both without and with the linearization correction.

As previously discussed, an RF device with a digital control input including a compensation function generates a more ideal output than a non-compensated RF device. For example, a vector modulator can have an unadjusted non-linear output as shown in FIG. 8, where the phase-step spacing can be non-ideal and the output gain is non-ideal. FIG. 9 illustrates a vector modulator output with correction, thereby generating a substantially constant spacing of the phase-states and substantially constant gain. The vector modulator output illustrated in FIG. 9 is much closer to ideal compared to the output illustrated in FIG. 8. Similarly, FIGS. 10 and 11 also illustrate the improvement of a vector modulator output if corrected versus uncorrected. Specifically, FIG. 10 shows a vector modulator gain error comparison for a vector modulator with 64 phase states. FIG. 11 shows a vector modulator phase error comparison for the vector modulator with 64 phase states.

Figure 12:
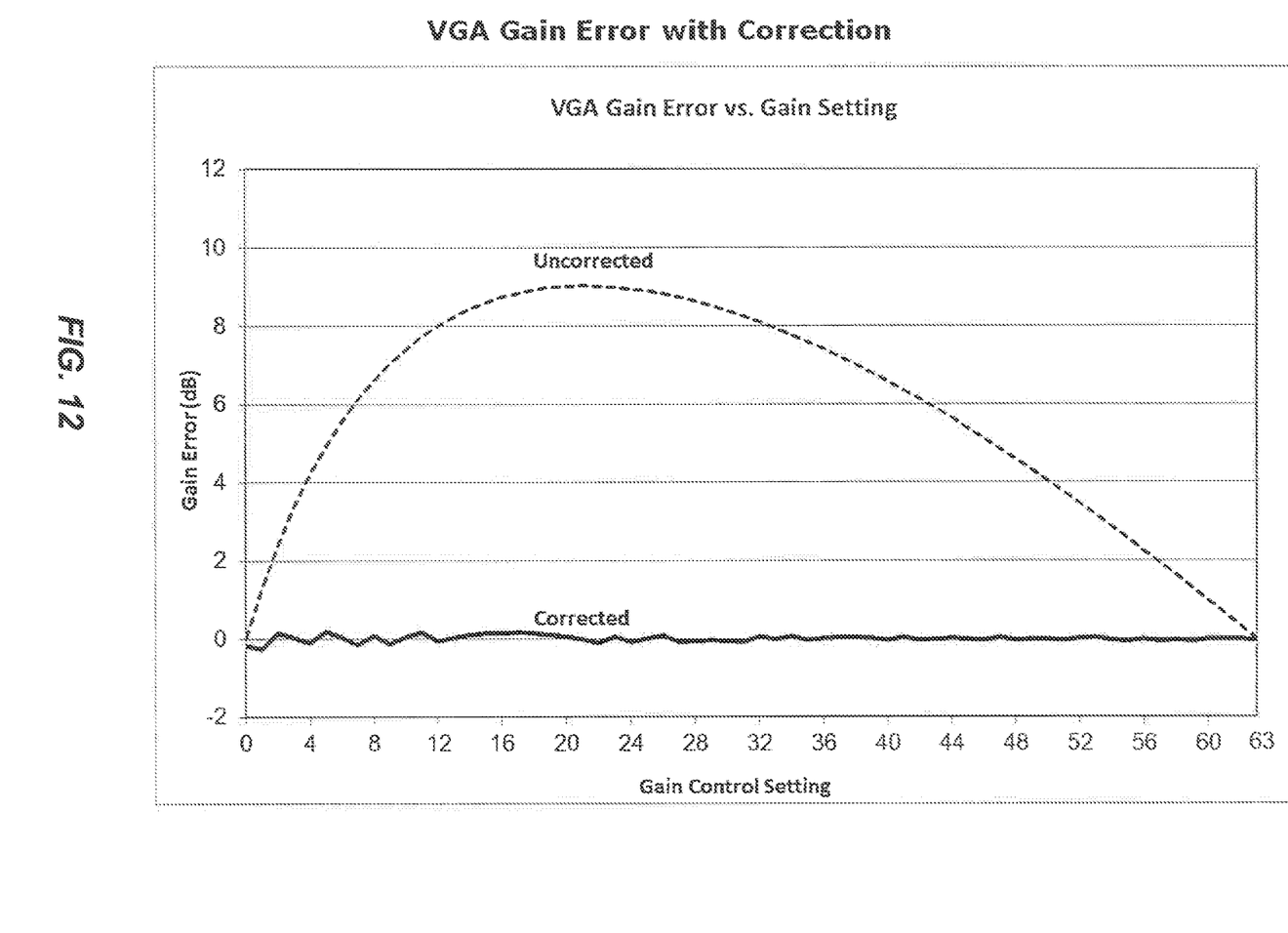
FIG. 12 shows an example gain error of a variable gain amplifier both without and with the linearization correction.

As previously described, the compensated RF device can also be a VGA. FIG. 12 shows a graphical representation of a VGA gain error, both corrected and uncorrected. The VGA gain is set during design at both a minimum control input (0 as shown) and a maximum control input (63 as shown). So by design, the gain at these points is equal to the expected gain output. However, at the various gain-states in between the gain has an error, resulting in a non-linear gain when attempting to set the VGA gain at a middle gain-state. As illustrated, a VGA with compensation generates a correct gain that is substantially linear and closer to the expected gain.

While particular examples of numbers of bits and devices have been illustrated above, the same concepts may be applied to other digital control word sizes and device types.

In describing the present disclosure, the following terminology is used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. Numerical data may be expressed or presented herein in a range format, it is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

In general, the disclosure is provided by way of example and is not a limitation. The specific ranges and numbers disclosed in the papers are for illustration only, and do not limit the disclosure to those specific examples, ranges, or frequency bands. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "includes," "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the disclosure unless expressly described as "essential" or "critical."

The invention claimed is:

1. An integrated circuit device comprising:
   a radio-frequency device having an analog input, a digital control input, and an analog output, wherein an unadjusted transfer response of the analog output relative to the analog input and the digital control input differs from an ideal transfer response;
   a hard-wired lookup table having a lookup table digital control input and a modified control function, the modified control function of the hard-wired lookup table coupled to the digital control input of the radio-frequency device generates a modified digital control input;
   wherein the hard-wired lookup table produces the modified control function as a predetermined function of the lookup table digital control input of the hard-wired lookup table such that an adjusted transfer response of the analog output of the radio-frequency device relative to the analog input and the modified digital control input is closer to the ideal transfer response than the unadjusted transfer response of the analog output relative to the analog input and the digital control input; and
   wherein the predetermined function is defined by metallization connections within the integrated circuit device.

2. The integrated circuit device of claim 1, wherein the radio-frequency device and the hard-wired lookup table are disposed on a same semiconductor substrate.

3. The integrated circuit device of claim 1, wherein the hard-wired lookup table is implemented in a bus structure using a plurality of value cells.

4. The integrated circuit device of claim 3, wherein the plurality of value cells comprises a plurality of open drain transistor cells.

5. The integrated circuit device of claim 1, wherein the radio-frequency device is at least one of a phase modulator, a variable gain amplifier, a vector modulator, or an active vector generator.

6. The integrated circuit device of claim 1, wherein the hard-wired lookup table exploits bi-fold symmetry of the radio-frequency device.

7. The integrated circuit device of claim 3, wherein the plurality of value cells includes a first value cell, the first value cell comprising:
   a first pair of bit-control transistors in communication with a first enable signal;
   a first bit bus; and
   a first cross-member connecting the first bit bus to only one of the first pair of bit control transistors, wherein the first cross-member is connected during manufacture in order to set a bit value of the first pair of hit-control transistors to form a metallization connection.

8. The integrated circuit device of claim 7, wherein the first value cell further comprises:
   an Nth pair of bit-control transistors in communication with the first enable signal;
   an Nth bit bus; and
   an Nth cross-member connecting the Nth bit bus to only one of the Nth pair of bit-control transistors, wherein the Nth cross-member is connected during manufacture in order to set a bit value of the Nth pair of bit-control transistors;
   wherein the hard-wired lookup table further comprises an Mth value cell and N bits of bit control, and wherein the hard-wired lookup table has 2*M*N bit-control transistors.

9. A hard-wired lookup table configured for compensation of a non-ideal transfer response of a radio frequency (RF) device, the hard-wired lookup table comprising:
   a first value cell comprising:
      a first pair of bit-control transistors in communication with a first enable signal;
      a first bit bus; and
      a first cross-member connecting the first hit bus to only one of the first pair of bit-control transistors, wherein the first cross-member is connected during manufacture in order to set a hit value of the first pair of bit-control transistors.

10. The hard-wired lookup table of claim 9, wherein the first value cell further comprises:
    a second pair of bit-control transistors in communication with the first enable signal;
    a second bit bus; and
    a second cross-member connecting the second bit bus to only one of the second pair of bit-control transistors, wherein the second cross-member is connected during manufacture in order to set a bit value of the second pair of bit-control transistors.

11. The hard-wired lookup table of claim 9, wherein the hard-wired lookup table further comprises a second value cell.

12. The hard-wired lookup table of claim 9, wherein the first value cell further comprises
    an Nth pair of bit-control transistors in communication with the first enable signal;
    an Nth bit bus; and
    an Nth cross-member connecting the Nth bit bus to only one of the Nth pair of bit-control transistors, wherein the Nth cross-member is connected during manufacture in order to set a bit value of the Nth pair of bit-control transistors;
    wherein the hard-wired lookup table further comprises an Mth value cell and N bits of bit control, and wherein the hard-wired lookup table has 2*M*N bit-control transistors.

13. The hard-wired lookup table of claim 12, wherein $M \geq 3$ and $N \geq 3$.

14. The hard-wired lookup table of claim 9, wherein the hard-wired lookup table is part of an integrated circuit device, and wherein the integrated circuit device comprises:
    a radio-frequency device having an analog input, a digital control input, and an analog output, wherein an unadjusted transfer response of the analog output relative to the analog input and the digital control input differs from an ideal transfer response;

wherein the hard-wired lookup table has a lookup table digital control input and a modified control function, the modified control function of the hard-wired lookup table coupled to the digital control input of the radio-frequency device generates a modified digital control input;

wherein the hard-wired lookup table produces the modified control function as a predetermined function of the lookup table digital control input of the hard-wired lookup table such that an adjusted transfer response of the analog output of the radio-frequency device relative to the analog input and the modified digital control input is closer to the ideal transfer response than the unadjusted transfer response of the analog output relative to the analog input and the digital control input; and wherein the predetermined function is defined by the connection of the cross-member setting the bit value of the first pair of bit-control transistors.

15. The hard-wired lookup table of claim 14, wherein the radio-frequency device and the hard-wired lookup table are disposed on a same semiconductor substrate.

16. The hard-wired lookup table of claim 9, wherein the first pair of bit-control transistors include a p-channel FET and an n-channel FET.

17. The hard-wired lookup table of claim 16, further comprising an enable module providing the first enable signal to the n-channel FET in each pair of bit-control transistors and providing the first enable signal as an inverted first enable signal to the p-channel FET in each pair of bit-control transistors;

wherein the enable module receives the first enable signal from an address decoder; and wherein the inverted first enable signal is provided to the gate of the p-channel FET, and wherein the first enable signal is provided to the gate of the n-channel FET.

18. The hard-wired lookup table of claim 17, wherein the source of the p-channel FET is connected to a drain supply voltage (Vdd), wherein the source of the n-channel FET is connected to a source supply voltage (Vss), and either:

the drain of the p-channel FET is connected to the first bit bus, or the drain of the n-channel FET is connected to the first bit bus.

19. A method of compensating an analog output of a radio-frequency device, the method comprising:

receiving, at the radio-frequency device, an analog input and a digital control input;

generating, by the radio-frequency device, an analog output based on the analog input and the digital control input;

producing, by a hard-wired lookup table, a modified control function as a predetermined function of a lookup table digital control input of the hard-wired lookup table;

combining the modified control function into the digital control input to generate a modified digital control input, wherein an adjusted transfer response of the analog output of the radio-frequency device relative to the analog input and the modified digital control input is closer to the ideal transfer response than an unadjusted transfer response of the analog output relative to the analog input and the digital control input;

wherein the predetermined function is defined by metallization connections within the integrated circuit device.

20. A method of claim 19, wherein the integrated circuit device includes a hard-wired lookup table having the predetermined function, and wherein the method of setting the predetermined function comprises:

determining a size of the hard-wired lookup table, wherein the size is based on a number of value cells in the hard-wired lookup table and a number of output bits from the hard-wired lookup table;

determining an output value of the output bits for each value cell of the number of value cells in the hard-wired lookup table;

determining the binary values of each value cell in the hard-wired lookup table based on the output value of the value cell, wherein the number of value cells individually comprise at least one bit bus and at least one pair of bit-control transistors in communication with an enable signal; and selecting a transistor connection for each of the at least one pair of bit-control transistors in each of the number of value cells, wherein a cross-member connects the at least one bit bus to only one of a corresponding pair of bit-control transistors of the at least one pair of bit-control transistors to form a metallization connection;

wherein the cross-member is connected during manufacture in order to set the binary value of the corresponding pair of bit-control transistors.

* * * * *

UNITED STATES PATENT AND TRADEMARK OFFICE
CERTIFICATE OF CORRECTION

PATENT NO.        : 9,094,277 B2                                    Page 1 of 1
APPLICATION NO.   : 13/607077
DATED             : July 28, 2015
INVENTOR(S)       : David Self It is certified that error appears in the above-identified patent and that said Letters Patent is hereby corrected as shown below:

In The Claims

Column 10, Claim 7, line 2, delete "hit" and insert --bit--

Column 10, Claim 7, line 5, delete "hit-control" and insert --bit-control--

Claim 9, line 29, delete "hit" and insert --bit--

Claim 9, line 32, delete "hit" and insert --bit--

Claim 12, line 48, after "further comprises" add --:--

Signed and Sealed this
Ninth Day of February, 2016

Michelle K. Lee
*Director of the United States Patent and Trademark Office*